Dec. 8, 1964    D. L. BARRETT    3,160,194
TIRE PATCH

Filed March 28, 1963    2 Sheets-Sheet 1

INVENTOR.
DONALD L. BARRETT
BY
*J B Holden*
ATTORNEY

Dec. 8, 1964 D. L. BARRETT 3,160,194
TIRE PATCH
Filed March 28, 1963 2 Sheets-Sheet 2

INVENTOR.
DONALD L. BARRETT
BY
*J. B. Holden*
ATTORNEY

United States Patent Office 3,160,194
Patented Dec. 8, 1964

3,160,194
TIRE PATCH
Donald L. Barrett, Akron, Ohio, assignor to The Goodyear Tire & Rubber Company, Akron, Ohio, a corporation of Ohio
Filed Mar. 28, 1963, Ser. No. 268,630
5 Claims. (Cl. 152—367)

This invention relates to a new patch, particularly designed for patching tires, and includes the patched tire. The tire may or may not be a retreaded tire.

The patch comprises one or more plies of rubber in which there are short, discontinuous lengths of filamentary material which reinforce the patch. These lengths of filamentary material are orientated so that they lie in the same general direction in the respective plies, and if the patch be a multi-ply patch, the adjacent plies of the patch are angled in different directions so that the filamentary material in adjacent plies is orientated in different directions.

The filamentary material may be flock or cotton or rayon, etc. cords or filaments of rayon or nylon, or short lengths of wire. If steel wire is used, the filamentary material is preferably coated with brass to form a bond with the rubber in the patch.

The filamentary material, if of an organic composition, is preferably about ¼ inch to 2 inches in length. If of wire, it is generally no more than about ¾ inch long. Nylon filaments are preferred. The short lengths of filamentary material are orientated in the plies, as by milling the short lengths into the rubber, and by further orientation, if desired, by calendering the stock or tubing it. In patch material reinforced with short lengths of wire, it is not possible to orientate the wire to the extent that other short lengths are orientated. The filamentary material adds tensile strength to the plies and by orientation of the filamentary material the tensile strength is increased in the direction of orientation.

Any suitable rubber compound can be employed in the plies containing the filamentary material. Tread stock is of course preferred for patching tire treads and other stock may be used for sidewalls, etc. The patch may be pre-formed or it may be built up on the tire.

If the tire is to be retreaded as well as being repaired, the buffed outer surface of the tire carcass may be patched before applying the new tread. Otherwise, the patch is applied to the inner surface of the carcass.

In repairing a break or cut in a tire, the broken ends of the carcass fabric are cut away to provide a generally rounded or otherwise enlarged opening which is filled with rubber, referred to as a plug. If the opening is small, measuring no more than about ¼ inch in its greatest dimension, the plug generally constitutes the only repair material that is required. If the opening measures more than one inch across in any direction, a section repair with a fabric patch is indicated.

The repairs to which this invention relates are made in tires in which the opening is of intermediate size, measuring at least about ¼ inch in every direction, and not over one inch in the greatest direction. In making this repair, the opening is plugged with rubber, the inner surface of the tire around the opening is abraded to remove excess rubber in the customary manner, and the inner surface of the plugged opening is covered with one or more patch plies. The lengths of filamentary material in a single ply patch, or in at least one of the plies of a multi-ply patch, and preferably the ply adjacent the carcass, are aligned parallel to the cords in the carcass ply adjacent that surface. The area of contact between the plies and the abraded carcass surface is that customarily utilized to give an adequate bond.

The advantages of this particular patch technique will be better understood if we analyze the purposes of a patch.

A patch replaces strength lost due to a tire carcass injury. The smaller the hole, the more successful the patch. The tire carcass carries most of the strength loss in the area around the hole. The strength replaced by a patch of the type herein disclosed, depends upon the adhesive area in which the plies are bonded to the carcass, and the ability of the patch to hold to the inside of the tire under load and normal road flexing, etc. in service.

As will be explained, the patch of this invention gives superior service because the bond between the patch and the tire in this adhesive area is more permanent than when a patch reinforced with cord plies, for instance, is employed. Also, the adhesive strength of the initial bond is greater. Thus, although the blow-out strength of the patches of this invention may be somewhat inferior to that of patches containing lengths of filamentary material which are continuous from one end of the patch to the other, they have the necessary blow-out strength and have such superior ability to adhere to the tire in service, that they give superior results.

The superior service of the patch of this invention is to large extent due to its greater elongation which in turn is due to the fact that the many short reinforcing filaments do not extend the entire length of the patch.

For instance, a patch provides means for resisting direct thrust on the tire plug, such as is produced when the tire is run over a stone. The reinforced patch of this invention is superior because although the short filamentary lengths serve to reinforce the rubber, they are not continuous, and permit the patch to stretch more readily than a patch with continuous-cord reinforcement. Moreover, the patch of this invention flexes more easily than a patch with continuous cords, and is less apt to separate from the tire. The stretch in such instances is temporary and the patch quickly recovers to its original dimensions.

The invention is now further described in connection with the accompanying drawings, in which—

Figure 1:
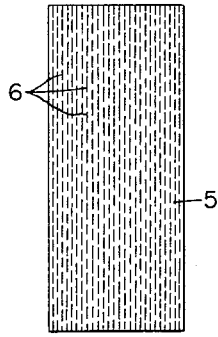
FIGURE 1 is a top view of a single straight-ply patch.

In the drawings, the single ply 5 of FIGURE 1 contains short lengths of nylon filaments 6. These short lengths are orientated, preferably by first mixing them with the rubber stock on a mill, and then orientating the filamentary material as the stock is thinned out in passing between the rolls. This milling separates the individual fibers contained within the filaments and disperses them within the rubber. The short fibers are then further orientated when the stock is calendered.

The amount of filamentary material contained in the stock may vary, but ordinarily 5 to 15 percent by weight of nylon or other organic filamentary material will be satisfactory, and 10 to 25 percent by weight of short lengths of wire may be used. The amount of filamentary material used will depend upon the nature of the filamentary material, the thickness of the plies, the number of plies in the patch, and the location of the patch, etc.

Figure 2:
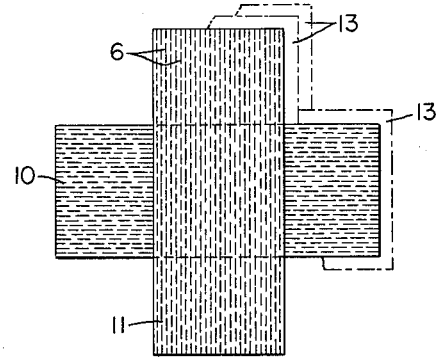
FIGURE 2 is a top view of a patch made up of crossed plies.

FIGURE 2 shows a prepared patch formed of the plies 10 and 11 (and additional plies 13, 13, 13 . . . shown in dot-dash lines). Any number of such plies may be employed, depending upon the size and location of the tire injury, etc. If the patch is pre-fabricated of the two plies 10 and 11, these plies ordinarily cross one another at right angles so that the orientated material they contain is located generally at right angles. Thus the angle between the short lengths of filamentary material approaches the angle of the cords in the tire to which they are applied, whether the application of the patch be to the tread of the tire or near the beads.

The tensile strength of the plies is much greater in the direction of orientation than in the direction across the orientation, and this is taken advantage of by crossing the plies at right angles to one another. If three plies are used they may be arranged with the plies and the filamentary material contained in the respective plies orientated at 60 degrees with respect to the direction of the orientated material in the adjacent ply or plies. Thus, the angle at which the plies are placed on one another may be varied.

Figure 3:
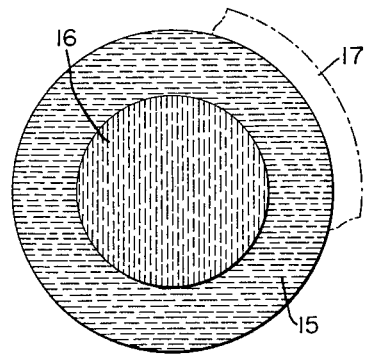
FIGURE 3 is a top view of a patch made up of circular plies.

Instead of using rectangular plies, the plies may be circular. FIGURE 3 illustrates a patch comprising a larger circular ply 15 with a smaller circular ply 16 superimposed upon it. One or more larger plies 17 may be used. The filamentary material in each of the respective plies 15 and 16 is orientated at an angle of 90 degrees to the filamentary material in the adjacent ply. If three or more plies are used, the filamentary material in each of the adjacent plies may be arranged at an angle of 60 degrees or less to the one or more plies adjacent to it. Thus, there is a wide variation possible in the manner of plying up the individual plies to obtain high tensile strength in all directions.

Known variations in the structures shown comprise the use of one or preferably more circular plies such as shown in FIGURE 3, with two or more elongated plies such as shown in FIGURE 2 superimposed on the smallest of the circular plies.

Figure 4:
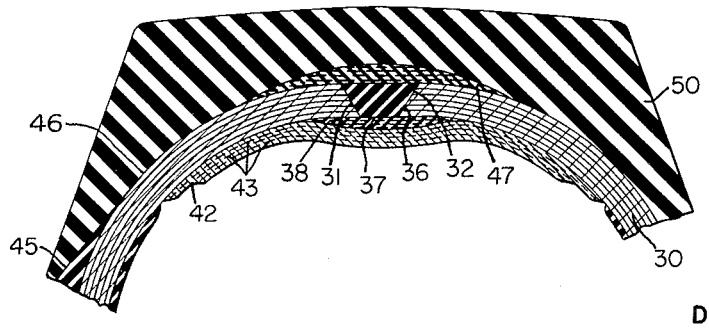
FIGURE 4 is a section through a patched retreaded tire.

FIGURE 4 illustrates the use of the patches of this invention in repairing a tire. The repair was made after the tread had been removed prior to retreading. In this instance the carcass 30 of the tire had a break or cut, and to repair the tire, damaged cords were removed by cutting along the lines 31 and 32. The size of the opening measures more than ¼ inch and is no greater than about one inch from one edge to the opposite edge farthest from it in any one plane. The surface of the carcass on both the inside and the outside of the tire was abraded to remove excess rubber. A plug of suitable rubber compound 36 was then filled into the opening along lines 31 and 32, and the exposed inner surface of the rubber 37 was covered with a patch. This patch may be a crisscross or circular patch 38 of two or more layers, such as illustrated in FIGURES 1, 2, 3 and 4. An inner ply of rubber 42 containing filamentary material 43 orientated in any direction was then applied over the patch. The filamentary material in the ply of the patch 38 adjacent the carcass is orientated and parallel to the carcass cords in the ply adjacent the patch. The line 45 indicates the line to which the tread was buffed for retreading.

The tire repair is then subjected to vulcanization in a usual manner.

The outer surface of the buffed carcass 46 of a tire which is to be retreaded, may also be patched and this may be done with a criss-cross or circular patch 47 of the same material as the patches illustrated in FIGURES 1, 2, 3 and 4, including short lengths of filamentary material. The filamentary material in the ply adjacent the carcass preferably lies parallel to the cords in the outer ply of the tire. New tread rubber 50 is then put in place in the usual manner. The tire is then subjected to vulcanization in a usual retreading mold. Heat is supplied to the new rubber from the mold and from a bag inserted in the tire in any usual manner.

Figure 5:
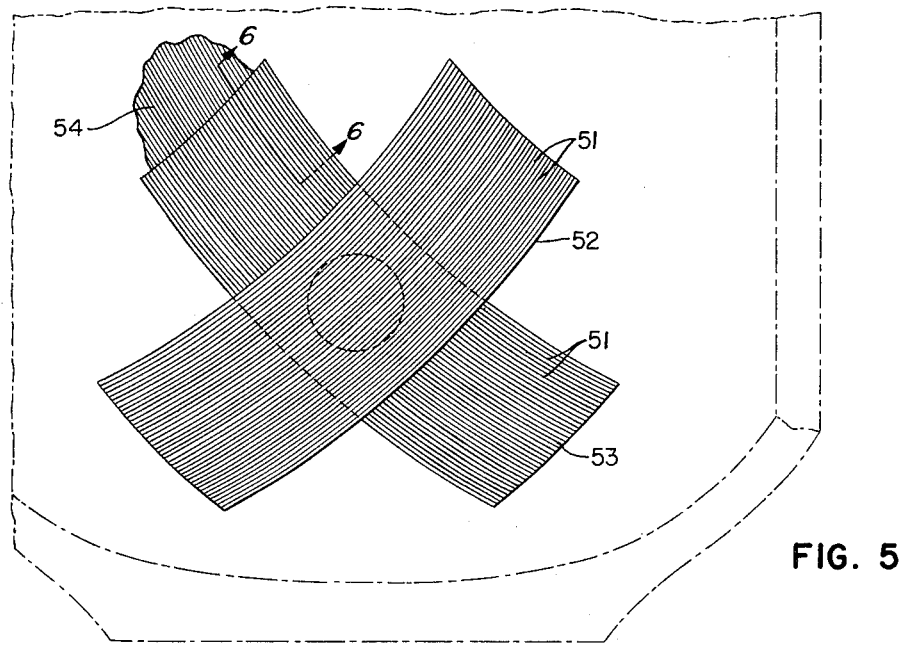
FIGURE 5 is an enlarged isometric showing of a cord-reinforced patch of FIGURE 2 applied to the inner surface of a tire with a portion of the covering on the inner surface of the tire broken away.
Figure 6:
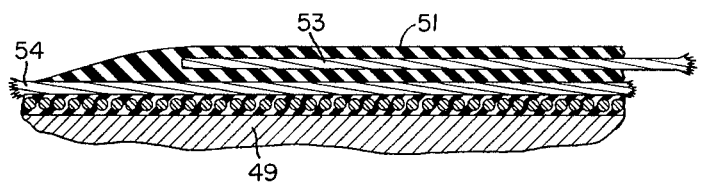
FIGURE 6 is a section on the line 6—6 of FIGURE 5.
Figure 7:
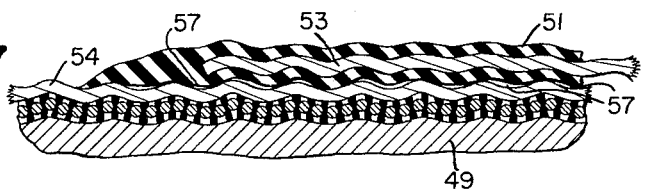
FIGURE 7 is a view similar to that shown in FIGURE 6, but with areas of the patch separated from the carcass.

FIGURES 5, 6 and 7 illustrate a tire 49 patched with patches reinforced with cords 51 which are continuous from one end of each of the plies 52, 53 to the other end. The cords in ply 53 are parallel to those carcass cords 54 which are closest to the patch.

Historically, the first ply of a cord-reinforced patch has been laid with the cords parallel to the adjacent carcass cords. Such patches form a stronger bond to the carcass than when the cords in this ply and the carcass cords are not parallel. In service, with the cords adjacent the bond parallel, the cords work together better to resist shear due to the tire flexing, squirming and rippling, and better to match the panographing of the cords.

Figure 8:
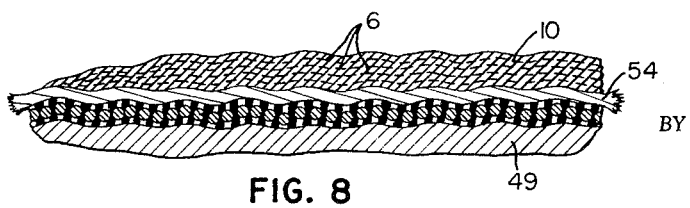
FIGURE 8 is a similar view but showing the patch of FIGURE 2 applied to a tire.

FIGURE 6 shows a patched section of a tire when at rest, and FIGURE 7 is a view of the same with the tire rippled, as by the sudden application of brakes, overloading, under inflation, etc. The rippling has caused separation of the ply 53 from the tire 49 in the area of adhesion or bond 57. The patch of FIGURE 2 of this invention is better able to withstand such rippling without separation because the filamentary material 6 is not continuous and the ply is therefore stretched slightly with greater ease. FIGURE 8 shows a tire 49 with the patch of FIGURE 2 adhered to it with the filamentary material 6 in the ply 10 parallel to the adjacent cords 54 in the tire. Experience has shown that this type of patch does not separate from a tire as readily as a patch reinforced with cords, and this is illustrated by a comparison of FIGURES 7 and 8.

It is recognized that when a cord-reinforced ply is adhered to a carcass with the adjacent cords parallel, the strain on the cords adjacent the ends of the ply of the patch is often sufficient to cause all of the patch cords to break, from one side of the patch to the other. The greater stretch in the plies of this invention withstands such strains, giving a more permanent patch because the strains which cause such breakage of the cords also cause separation of the patch from the tire.

Particular reference has been made to the patch plies adjacent to the tire carcass. Other plies in which the filamentary material is orientated in a parallel direction similarly are more serviceable than plies in which there is continuous reinforcement from one end of the ply to the other. Plies in which the reinforcement (whether continuous, or discontinuous as in the patch of the invention) is not parallel to the carcass cords adjacent to the patch, are subjected to greater strain than reinforcement which is parallel to such carcass cords because of forces which tend to separate these carcass cords from one another. The discrete or non-continuous filamentary material permits patch plies of this invention to "give" or stretch to an extent which prevents them from breaking under forces which break continuous cords. The patches of this invention therefore are more permanent and have longer life than the customary patches reinforced with continuous cords.

It is true that continuous nylon filaments or cords are capable of stretching more than cotton or rayon cords, but they shrink during cure. The short discontinuous lengths, utilized in the patch of this invention shrink individually, without causing over-all shrinkage from one end of a ply to the other and thus overcome the objectionable shrinkage inherent in patches reinforced with continuous nylon filaments.

This application is a continuation-in-part of my application Serial No. 126,596 filed July 25, 1961 and now abandoned.

The invention is covered in the claims which follow.

What I claim is:

1. A retreaded cord tire with a carcass having an opening therethrough measuring at least ¼ inch across and not substantially more than one inch in any direction, a rubber plug in the opening, the inner and outer surfaces of the carcass being abraded around the opening close to the cord surfaces in the carcass, patches over the plug and adhered to said respective abraded surfaces, each patch comprising a ply of rubber adjacent the carcass in which there are short, discontinuous lengths of filamentary material generally orientated parallel to the tire cords adjacent the patch, with a new tread over the patch on the outer surface of the carcass.

2. A retreaded cord tire with a carcass having an opening therethrough measuring at least ¼ inch across and not substantially more than one inch in any direction, a rubber plug in the opening, the outer surface of the carcass being abraded around the opening close to the cord surfaces in the carcass, a patch over the outer surface of the plug adhered to said abraded surface, the patch comprising a ply of rubber in which there are short discontinuous lengths of filamentary material generally orientated parallel to the tire cords adjacent the patch, with a new tread on the carcass over the patch.

3. A tire patch which includes a plurality of rubber plies reinforced with filamentary material, the reinforced ply nearest one surface of the patch being reinforced with discontinuous lengths of filamentary material dispersed therein, such lengths being generally orientated in the same direction and each being substantially ¼ to 2 inches long.

4. A cord tire with an opening through its carcass measuring at least ¼ inch and not substantially more than one inch in any direction, one surface of the carcass being abraded around the opening close to the tire cord surfaces, a plug in the opening, and a patch over the plug and adhered to said abraded surface which patch is composed of plies of rubber reinforced with filamentary material in which and adjacent to the entire surface of the patch adhered to said abraded surface there are short, discontinuous lengths of filamentary material generally orientated parallel to the tire cords adjacent the patch.

5. A cord tire having an opening through its carcass measuring at least ¼ inch and not substantially greater than one inch in any direction, a rubber plug in the opening, the inner surface of the carcass being abraded around the opening close to the tire cord surfaces, and over the plug and adhered to said abraded surface a patch composed of a plurality of rubber plies reinforced with filamentary material, the ply of the patch nearest the carcass being composed of rubber having dispersed therein throughout its entire area short, discontinuous lengths of filamentary material generally orientated parallel to the tire cords adjacent the patch.

References Cited in the file of this patent

UNITED STATES PATENTS

| | | |
|---|---|---|
| 2,483,010 | Hooper | Sept. 27, 1949 |
| 2,512,309 | Cornell | June 20, 1950 |
| 3,057,389 | Dubetz et al. | Oct. 9, 1962 |
| 3,080,907 | Barrett | Mar. 12, 1963 |